(12) United States Patent
Kendrick et al.

(10) Patent No.: US 10,066,694 B2
(45) Date of Patent: Sep. 4, 2018

(54) ASSEMBLY, BRIDGING TOOL FOR AN ASSEMBLY AND METHOD OF FORMING AN ASSEMBLY

(71) Applicant: Safran Landing Systems UK Limited, Gloucester (GB)

(72) Inventors: Daniel Charles Kendrick, Gloucester (GB); Andraz Vatovec, Gloucester (GB)

(73) Assignee: Safran Landing Systems UK LTD (GB)

(*) Notice: Subject to any disclaimer, the term of this patent is extended or adjusted under 35 U.S.C. 154(b) by 0 days.

(21) Appl. No.: 15/275,811

(22) Filed: Sep. 26, 2016

(65) Prior Publication Data

US 2017/0089418 A1 Mar. 30, 2017
US 2017/0356519 A9 Dec. 14, 2017

(30) Foreign Application Priority Data

Sep. 28, 2015 (EP) .................... 15187104

(51) Int. Cl.
*F16F 9/32* (2006.01)
*F16F 9/18* (2006.01)
*B64C 25/60* (2006.01)
*F16F 9/36* (2006.01)
*F16F 9/06* (2006.01)

(52) U.S. Cl.
CPC ............ *F16F 9/3264* (2013.01); *B64C 25/60* (2013.01); *F16F 9/185* (2013.01); *F16F 9/36* (2013.01); *F16F 9/062* (2013.01); *F16F 2230/24* (2013.01)

(58) Field of Classification Search
CPC .... F16F 9/3264; F16F 9/14; F16F 9/16; F16F 9/165; F16F 9/18; F16F 9/185; F16F 9/19; F16F 9/362; F16F 9/364; F16F 9/43; F16F 9/437; F17C 13/002; F17C 13/02
USPC ............ 188/322.16, 322.17; 141/67, 69, 349
See application file for complete search history.

(56) References Cited

U.S. PATENT DOCUMENTS

| | | | | |
|---|---|---|---|---|
| 4,475,577 A | * | 10/1984 | Cubalchini | F16F 9/432 141/349 |
| 4,483,377 A | * | 11/1984 | Cubalchini | F16F 9/432 141/349 |
| 4,556,092 A | * | 12/1985 | Cubalchini | F16F 9/432 137/860 |
| 5,529,155 A | * | 6/1996 | Jones | F16F 9/364 141/349 |

FOREIGN PATENT DOCUMENTS

| | | |
|---|---|---|
| JP | 2009127839 | 6/2009 |
| JP | 2010142802 | 12/2010 |

OTHER PUBLICATIONS

Extended European Search Report dated May 18, 2016 for European Application No. 15187104.3, 10 pages.

* cited by examiner

*Primary Examiner* — Thomas J Williams
(74) *Attorney, Agent, or Firm* — RatnerPrestia

(57) ABSTRACT

A tool for bridging an outer dynamic seal in a shock absorber to enable fluid leakage to be more readily determined. The tool having an insertion portion including one or more bridging channels, and a body portion that is thicker than the insertion portion. The insertion portion being installable within an annulus of a shock absorber to bridge a first shock absorber seal so as to place a portion of the annulus in fluid communication with an exterior of the hydraulic device via the one or more bridging channels.

18 Claims, 4 Drawing Sheets

ASSEMBLY, BRIDGING TOOL FOR AN ASSEMBLY AND METHOD OF FORMING AN ASSEMBLY

This application claims the benefit of and priority to European Application 15187104.3, filed Sep. 28, 2015, the contents of which are incorporated herein by reference.

BACKGROUND OF THE INVENTION

It is common for an assembly such as aircraft landing gear or car suspension system to include a piston and cylinder type hydraulic device such as a shock absorber or actuator.

A piston and cylinder hydraulic device can be provided with an internal seal arranged to confine hydraulic fluid to the device. However, hydraulic fluid can leak beyond the seal if the seal is not capable of withstanding the pressure of the hydraulic fluid; for example, if the seal is damaged during assembly of the hydraulic device.

Such leakage can remain undetected until after the shock absorber has been fitted to the assembly and in some cases until the assembly has been fitted to a larger assembly such as an aircraft or other vehicle. This can result in significant cost and delay, particularly in the case of an aircraft landing gear assembly.

SUMMARY OF THE INVENTION

According to a first aspect of the present invention, there is provided an assembly comprising:
  a hydraulic device comprising an outer cylinder slidably coupled to a sliding piston so as to define an annulus between them where the outer cylinder and sliding piston overlap, and first and second seals spaced axially from one another within the annulus to define an intermediate portion between them, the second seal being arranged to seal the intermediate portion from the interior of the hydraulic device in a substantially fluid tight manner to confine the hydraulic fluid to the device, the first seal being arranged to seal the intermediate portion from the exterior of the device; and
  a seal bridging tool comprising:
    an insertion portion including one or more bridging channels, the insertion portion being located within the annulus in parallel with the first seal to bridge the first seal so as to place the intermediate portion in fluid communication with the exterior of the hydraulic device via the one or more bridging channels; and
    a body portion which is relatively thick in comparison to the thickness of the insertion portion to inhibit the body portion entering the intermediate portion.

Thus, a bridging tool is applied to the hydraulic device for bridging an outer seal to enable any fluid which leaks past an inner seal within the hydraulic device to pass beyond the outer seal such that the leakage be more readily determined from the exterior of the hydraulic device. The bridging tool is not an operational part of the hydraulic device or assembly to which the hydraulic device is applied. Rather, the tool is intended to be removed before the assembly enters into operational service. The tool can assist an engineer in determining that an inner seal, such as a static or dynamic seal, within the hydraulic device has failed to withstand internal fluid pressure. The tool can therefore reduce the likelihood of a hydraulic device with a damaged or otherwise unsuitable inner seal being fitted to an assembly such as an aircraft or aircraft landing gear assembly.

The first seal can comprise an environmental seal; for example, a scraper seal. An environmental seal is generally not intended to provide a substantially fluid tight seal to inhibit the passage of shock absorber fluid; however, this can occur.

The first and/or second seal can each comprise one or more dynamic or a static seals.

The tool can be of unitary construction.

The one or more guide channels can be elongate slots formed between generally parallel inner and outer major faces of the insertion portion, the inner face being arranged in use to face the sliding piston. The channels are formed into the outer face, in some cases extending through the thickness of the insertion portion to the inner face.

Thus, the seal can press against the outer face of the insertion portion to encourage leaked fluid to pass the seal via the guide channels.

The bridging tool can include a drain hole formed at least partially through the body portion for receiving fluid regressing from the intermediate portion via the one or more channels. The hole can be blind, so as to define a reservoir for collecting leaked fluid.

This can aid an engineer in locating leaked fluid.

The bridging tool can include one or more guide channels arranged to direct fluid from the one or more bridging channels to the drain hole when the bridging tool is orientated in a first orientation.

This can increase the likelihood of leaked fluid being directed to the hole.

The body portion can includes an engagement formation such as a protrusion, recess or hole which is arranged to facilitate removal of the engagement tool from the hydraulic device.

The annulus-defining region of the sliding piston can be cylindrical in shape and the insertion portion can have a generally arcuate cross section of corresponding radius to the radius of the sliding piston. The side of the body which faces the sliding piston can have an arcuate cross section of corresponding radius to the radius of the sliding piston.

This can reduce the likelihood of leaked fluid escaping between the sliding piston and/or first seal on the one hand, and the tool on the other hand, which can increase the likelihood of leaked fluid passing the first seal via the guide channels of the tool.

The assembly can comprises an aircraft assembly, such as an aircraft landing gear assembly.

The invention is particularly useful when applied to an aircraft assembly because later stage intervention can be particularly costly and time consuming, especially in the case of an aircraft landing gear, which might require the aircraft being jacked up to permit disassembly, inspection and potentially replacement.

According to a second aspect of the present invention, there is provided a seal bridging tool arranged to be inserted into an annulus of a hydraulic device to form an assembly, the hydraulic device comprising an outer cylinder slidably coupled to a sliding piston so as to define an annulus between them where the outer cylinder and sliding piston overlap, the hydraulic device further comprising first and second seals spaced axially from one another within the annulus to define an intermediate portion between them, the second seal being arranged to seal the intermediate portion from the interior of the hydraulic device in a substantially fluid tight manner to confine the hydraulic fluid to the device, the first seal being arranged to seal the intermediate portion from the exterior of the device,
  the bridging tool comprising:

an insertion portion including one or more bridging channels, the insertion portion being located within the annulus in parallel with the first seal to bridge the first seal so as to place the intermediate portion in fluid communication with the exterior of the hydraulic device via the one or more bridging channels; and a body portion which is relatively thick in comparison to the insertion portion to inhibit the body portion entering the intermediate portion.

Optional features of the first aspect can be applied to the tool of the second aspect in an analogous manner.

According to a third aspect of the present invention, there is provided a method of forming an assembly, the method comprising the steps of:

providing a hydraulic device comprising an outer cylinder slidably coupled to a sliding piston so as to define an annulus between them where the outer cylinder and sliding piston overlap;

introducing the insertion portion of a seal bridging tool according to the second aspect into the annulus of the hydraulic device.

The step of introducing a seal bridging tool can comprise introducing a seal bridging tool into the annulus in conjunction with the an operational part of the hydraulic device comprising the first dynamic seal; for example, a gland nut.

This can reduce the likelihood of introduction of the tool causing damage to the first seal.

The method can further comprise a step of fitting the assembly to a vehicle, such as an aircraft.

The method can further comprise a step of removing the tool from the annuals prior to operational service of the vehicle.

The assembly can comprise an aircraft assembly such as an aircraft landing gear assembly and the vehicle is an aircraft.

Optional features of the first aspect can be applied to the hydraulic device and/or tool of the third aspect in an analogous manner.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFICATION DESCRIPTION OF EMBODIMENTS OF THE INVENTION

Figure 1:
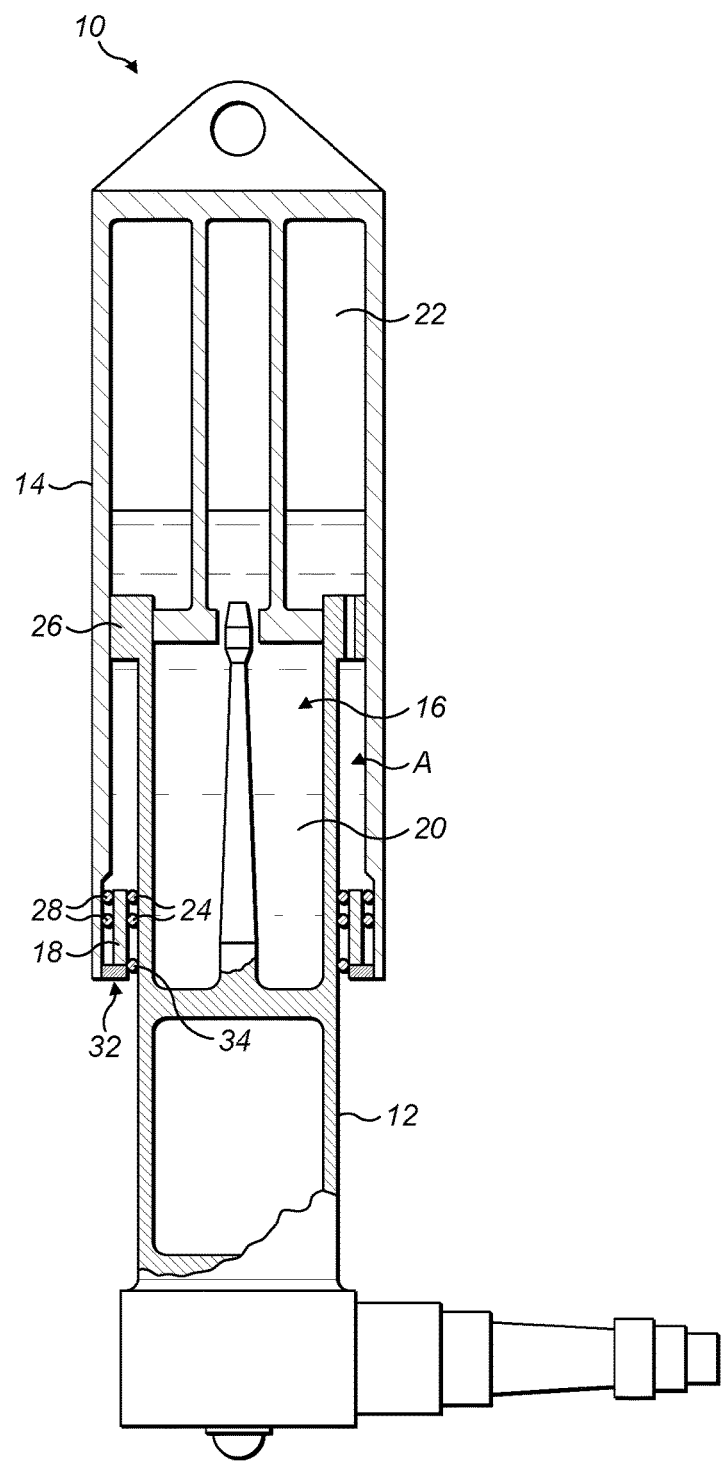
FIG. 1 is a schematic cross sectional view of a known aircraft landing gear assembly.

Referring first to FIG. 1, a known aircraft landing gear assembly comprising an oleo-pneumatic shock absorber is shown generally at 10. The shock absorber 10 forms the main strut of the aircraft landing gear.

The shock absorber comprises an inner housing portion 12, slidably coupled in an outer housing portion 14 via bearings 26. The inner housing portion is known in the art as a 'slider', 'sliding tube', 'inner cylinder', or 'piston', and the outer housing portion is known as a 'main fitting', or 'outer cylinder'.

The sliding piston 12 and main fitting 14 together define an internal cavity or chamber 16 which contains shock absorber fluid. In the illustrated embodiment the chamber 16 contains oil 20 in a lower portion thereof and gas 22 in an upper portion thereof. The oil 20 and gas 22 together make up the shock absorber fluid.

The region where the sliding piston 12 and main fitting 14 overlap defines an annulus A between adjacent surfaces of the sliding piston 12 and main fitting 14. The annulus A varies in size in accordance with the extension state of the shock absorber 10. The term "annulus" can mean a ring-like space which has a cylindrical or non-cylindrical cross sectional profile.

Figure 2:
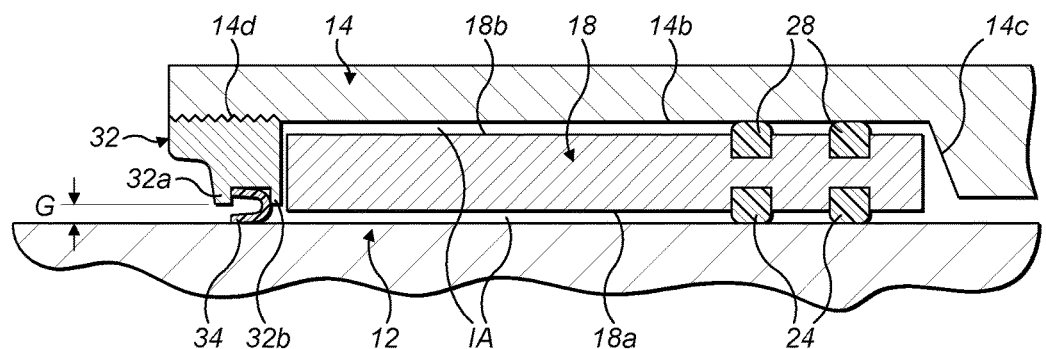
FIG. 2 is a schematic cross sectional view of the seal assembly of the landing gear assembly of FIG. 1.

Referring additionally to FIG. 2, an annular ring 18 is housed within the annulus A, adjacent to the open end of the main fitting 14. The annular ring 18 carries seals to confine the shock absorber fluid to the chamber 16.

A pair of dynamic seals 24 are mounted on the inner cylindrical face 18a of the annular ring 18 and arranged such that one or both of them press against the sliding piston 12 as the shock absorber extends and retracts, inhibiting the passage of shock absorber fluid from the chamber 16 to the outside environment.

A pair of static seals 28 are mounted on the outer cylindrical face 18b of the annular ring 18 to bear against the corresponding inner face 14b of the main fitting 14.

The annular ring 18 is locked in place within the annuls A between a shoulder portion 14c of the main fitting 14 and a gland nut 32 which is screwed into engagement with threaded end portion 14d of the main fitting 14.

In order to prevent dirt and other contaminants from entering the annulus A, an outer environmental seal 34 known in the art as a scraper seal or an extruder seal is provided. The scraper seal 34 is mounted in groove formed in the inner surface of the gland nut 32 between an outer flange 32a and an inner flange 32b so that its position is fixed relative to the cylinder 14.

The outer flange 32a also prevents larger objects from entering the annulus A through the gap between the outer surface of the sliding piston 12 and the inner surface of the main fitting 14. The outer flange 32a extends so that it is proximal to the outer surface of the piston 12, leaving a very small gap G between the inner edge of the flange 32a and the outer circumference of the sliding piston 12. This gap G may be engineered to accommodate for deflections in the sliding piston 12 during normal use such that during maximum lateral deflection of the sliding piston 12, it does not come into contact with the outer flange 32a.

The present inventors have identified that if the dynamic seals 24 or the static seals 28 fail then hydraulic fluid can leak and gather within the portion of the annulus A between the seals 24, 28 and scraper seal 34. This portion of the annulus A will be referred to herein as the intermediate portion IA of the annulus A. The leaked fluid can remain within the intermediate portion IA until such time that there is sufficient pressure for the leaked fluid to pass the scraper seal 34 or sealant within the threaded union between the gland nut 32 and main fitting 14. The process of the intermediate portion IA filling can take several months, meaning that detection might not occur until the shock absorber has been assembled into, say, a landing gear assembly, which in turn might have already been fitted to an aircraft assembly, thereby requiring time consuming and costly last minute interventions.

Figure 3:
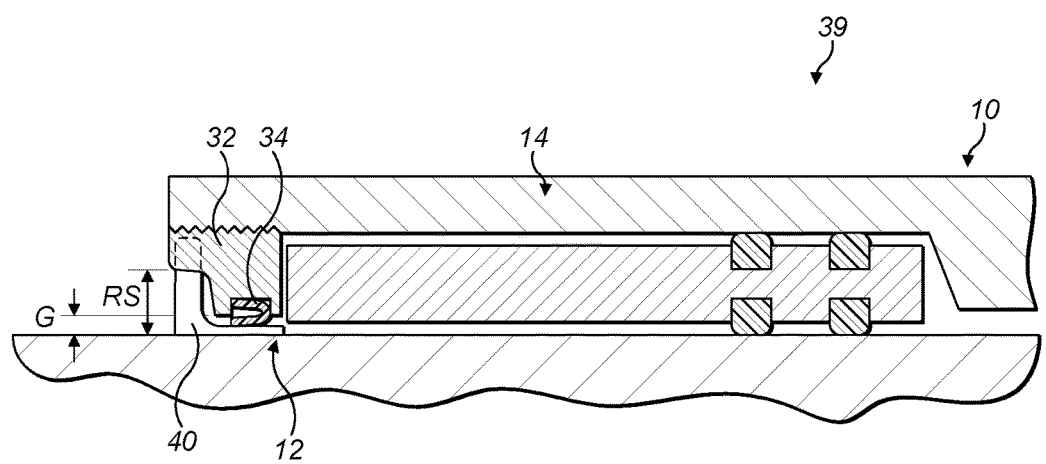
FIG. 3 is a schematic cross sectional view of the seal assembly of a landing gear assembly of FIG. 1 when fitted with a seal bridging tool according to an embodiment of the invention.
Figure 4:
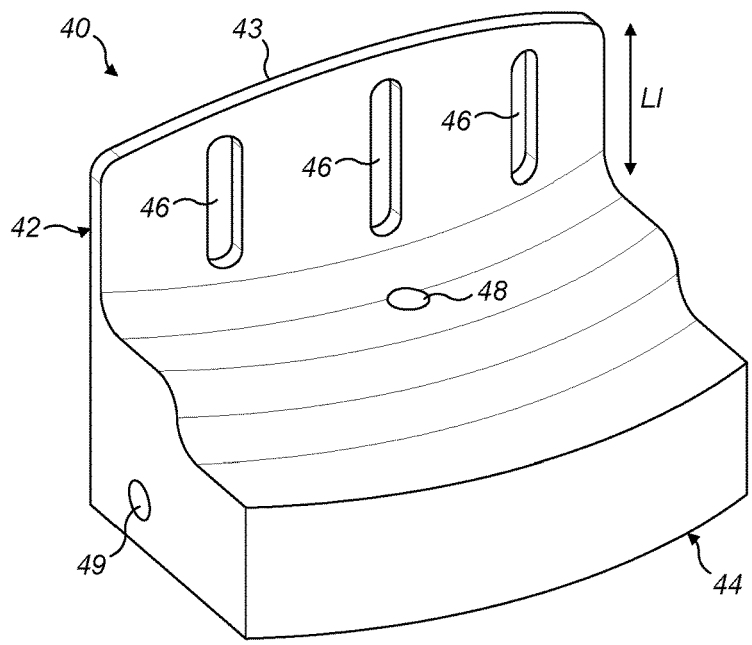
FIG. 4 is schematic perspective view of the seal bridging tool of FIG. 3.
Figure 5:
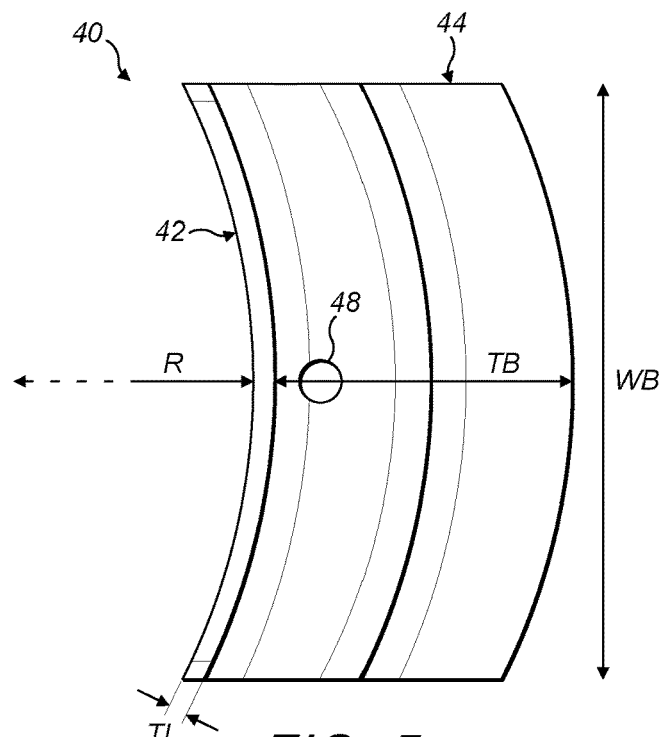
FIG. 5 is schematic plan view of the seal bridging tool of FIG. 3.

Referring now to FIGS. 3 to 5, a seal bridging tool according to an embodiment of the invention is shown generally at 40. The tool 40 is arranged to be applied to the landing gear assembly shock absorber of FIGS. 1 and 2 as a non-operational part which is arranged to enable the leakage of hydraulic fluid into the intermediate portion IA to be detected at a relatively early stage.

The tool 40 has a generally planar insertion portion 42 and a relatively bulbous body portion 44.

The insertion portion 42 is arranged to be installed within the gap G between the scraper seal 34 and the sliding piston 12. The insertion portion 42 is preferably shaped to conform or match the shape of the gap G, taking into account deflection of the scraper seal 34.

Guide channels in the form of slots 46 in the insertion portion enable leaked fluid to bypass the scraper seal 34. The slots 46 are long enough to span the seal 34 so that one end of each slot 46 communicates with the exterior of the shock absorber and the other end of each slot 46 communicates with the intermediate portion IA. This arrangement is particularly advantageous when applied to a tool 40 in which the insertion portion 42 is shaped to conform to or match the shape of the gap G, taking into account deflection of the scraper seal 34, because the seal 34 can press against the outer face of the insertion portion to encourage leaked fluid to pass the seal 34 via the guide channels. Likewise, the conforming inner face of the tool 40 can inhibit passage of fluid between the inner face of the tool 40 and the sliding piston 12.

The body portion 44 aides in handling of the tool and ensures that the tool 40 is not ingested into the shock absorber. The body portion 44 is preferably shaped to conform or match the space between the gland nut 32 and the sliding piston 12. The body portion 44 can protrude axially from the space.

The body portion 44 preferably incorporates a cross-hole 49, or other coupling formation to simplify disassembly, which can be used to pull the tool 40 out from underneath the scraper 34 and remove it when fluid leakage monitoring is complete and before the landing gear enters service.

The slots 46 are preferably in communication with guide vanes (not shown) shaped to direct leaked fluid into a drainage hole 48, which can be blind for collection and measurement, or can be open to permit leaking fluid to be identified through egress of the fluid from the tool 40.

The tool 40 can be red in colour so that it is distinguishable from operational parts of the shock absorber. A tag can also be fitted to the body portion 44 which highlights that the tool 40 should be removed before operational service of the aircraft.

As will be appreciated, the tool 40 dimensions will depend on specific application, accounting for factors such as the sliding tube 12 outer diameter, scraper squeeze and the size of the gap G between the gland nut 32 and sliding tube 12.

In the illustrated embodiment the insertion portion 42 can have a thickness TI of 0.75 mm, and length LI which is sufficient to enable each channel 46 to extend either side of the scraper seal 34 when the tool is fitted. The major surfaces of the insertion portion 42 are arcuate with a radius R which corresponds to the radius of the sliding piston 12. The surface of the body portion 44 arranged to face the siding piston 12 is preferably also arcuate of radius R.

Figure 6:
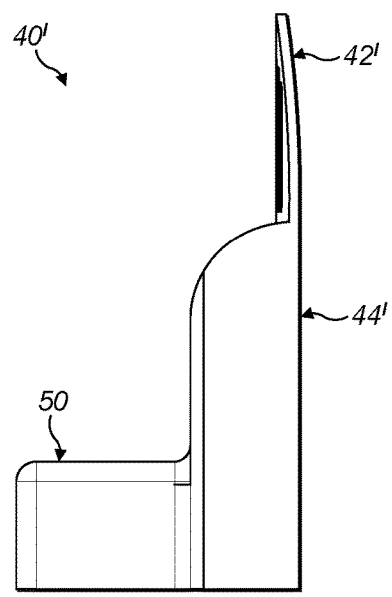
FIG. 6 is schematic side view of a seal bridging tool according to a further embodiment.
Figure 7:
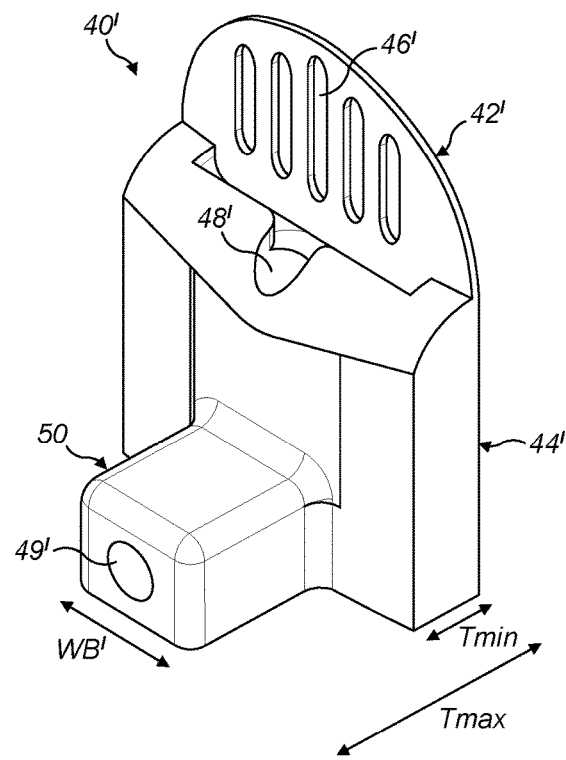
FIG. 7 is a schematic perspective view of the seal bridging tool of FIG. 6.
Figure 8:
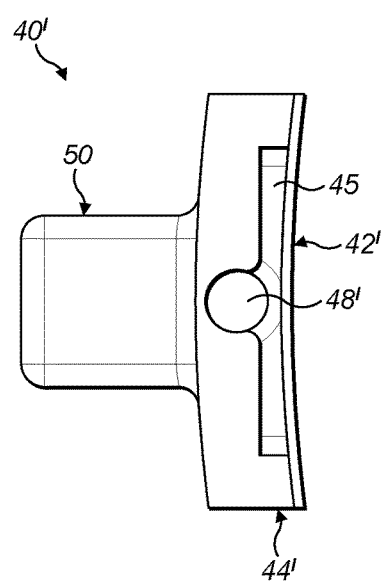
FIG. 8 is a schematic plan view of the seal bridging tool of FIG. 6.

The width WB of the body portion 44 can be such that the body portion 44 can extend into and be housed within a castellation of the gland nut 32. The width WB can match the internal width dimension of a castellation. This can ensure that the tool 40 maintains its intended location during torqueing of the gland nut 32, exploiting the fact that a torqueing tool uses only six of the twelve available castellations. Alternatively, as illustrated in FIGS. 6 to 8, a castellation engagement portion 50 of the body 44' of width WB' can be arranged to protrude with a maximum thickness Tmax that enters the castellation while the remainder of the body has a relatively thin profile of thickness Tmin that fits within the radial space, shown as RS in FIG. 2, between the gland nut 32 and the slider 12. The relatively thin portion of the body 44' includes the guide vanes 45 that direct leaked fluid from the channels 46' in the insertion portion 42' to the drainage hole 48'. The relatively thick portion 50 includes the cross hole 49'.

In other embodiments, the tool can have any suitable shape and configuration which includes an insertion portion including one or more bridging channels, the insertion portion being located within the annulus in parallel with an outer seal to bridge the outer seal so as to place the intermediate portion in fluid communication with the exterior of the hydraulic device via the one or more bridging channels and a body portion which is a relatively thick in comparison to the insertion portion to inhibit the body portion entering the intermediate portion.

The tool 40 can be manufactured from a material which will not cause damage to the mating surfaces of the hydraulic device and which will be of sufficient strength so that it maintains its structure when being fitted and removed; for example, a hard plastics material.

In use, the tool 40, 40' is preferably installed within the gap G between the scraper seal 34 and the sliding piston 12 at the production assembly stage, where the gland nut 32 and scraper seal 34 are screwed onto the main fitting 14. This can reduce the likelihood of damage to the scraper seal 34. It can then be maintained in position until such time that the landing gear would enter flight testing.

Alternatively, the tool 40, 40' can be inserted into the gap G once the gland nut 32 has been screwed into the main fitting 14. The tip 43 of the tool 42 can have smooth, rounded edges to reduce the likelihood of the tool 42 damaging the scraper seal 34 during installation.

Thereafter, leaked hydraulic fluid which passes the scraper seal 32 via the channels 46 is guided into the drainage hole 48, allowing for collection and facilitating monitoring by volume of fluid lost.

The tool 40, 40' is removed from gap G when fluid leakage monitoring is complete and before the landing gear enters service.

While the foregoing description has focussed on an aircraft landing gear assembly, it will be appreciated that the tool according to embodiments of the invention can usefully be applied to various assemblies, such as vehicle assemblies which require a hydraulic shock absorber or actuator.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An assembly comprising:
a hydraulic device comprising an outer cylinder slidably coupled to a sliding piston so as to define an annulus between them where the outer cylinder and sliding piston overlap, the hydraulic device further comprising first and second seals provided within the annulus to define an intermediate portion between them, the second seal being arranged to seal the intermediate portion from the interior of the hydraulic device in a substantially fluid tight manner to confine the hydraulic fluid to the device, the first seal being arranged to seal the intermediate portion from an exterior of the device; and
a seal bridging tool comprising:
an insertion portion including one or more guide channels, the insertion portion being located within the annulus in parallel with the first seal to bridge the first seal so as to place the intermediate portion in fluid communication with the exterior of the hydraulic device via the one or more guide channels; and
a body portion having a thickness selected to inhibit the body portion from entirely entering the intermediate portion;
wherein the seal bridging tool extends only partially around the sliding piston.

2. The assembly according to claim 1, wherein the bridging tool includes a drain hole formed at least partially through the body portion for receiving fluid egressing from the intermediate portion via the one or more channels.

3. The assembly according to claim 2, wherein the bridging tool includes one or more guide vanes arranged to direct fluid from the one or more guide channels to the drain hole when the bridging tool is oriented in a first orientation.

4. The assembly according to claim 1, wherein the insertion portion has generally parallel inner and outer major surfaces and the one or more guide channels are elongate slots formed into the outer major surface.

5. The assembly according to claim 1, wherein the body portion includes an engagement formation comprising one or more of a protrusion or a hole, the engagement formation being configured to facilitate removal of the seal bridging tool from the hydraulic device.

6. The assembly according to claim 1, wherein the annulus defining region of the sliding piston is cylindrical in shape and the insertion portion has a generally arcuate cross section of corresponding radius to the radius of the sliding piston.

7. The assembly according to claim 6, wherein a side of the body portion facing the sliding piston has an arcuate cross section of corresponding radius to the radius of the sliding piston.

8. The assembly according to claim 1, wherein the assembly comprises an aircraft assembly.

9. The aircraft assembly according to claim 8, wherein the aircraft assembly comprises an aircraft landing gear assembly.

10. The assembly according to claim 1, wherein the seal bridging tool is arranged to remain in position while the shock absorber extends.

11. The assembly according to claim 1, wherein the insertion portion has inner and outer major surfaces and the one or more guide channels are formed through the insertion portion, open to both the inner and outer major surfaces.

12. A method of forming an assembly, the method comprising the steps of:
providing a hydraulic device comprising an outer cylinder slidably coupled to a sliding piston so as to define an annulus between them where the outer cylinder and sliding piston overlap, the hydraulic device further comprising first and second dynamic seals spaced axially from one another within the annulus to define an intermediate portion between them, the second seal being arranged to seal the intermediate portion from the interior of the hydraulic device in a substantially fluid tight manner to confine the hydraulic fluid to the device, the first seal being arranged to seal the intermediate portion from an exterior of the device;
providing a seal bridging tool comprising:
an insertion portion including one or more guide channels, the insertion portion for location within the annulus in parallel with the first seal to bridge the first seal so as to place the intermediate portion in fluid communication with the exterior of the hydraulic device via the one or more guide channels; and
a body portion having a thickness selected to inhibit the body portion from entirely entering the intermediate portion; and
introducing the insertion portion of the seal bridging tool into the annulus of the hydraulic device; simultaneously with inserting an operational part of the hydraulic device.

13. The method according to claim 12, further comprising fitting the assembly to a vehicle.

14. The method according to claim 13, further comprising removing the tool from the annulus prior to operational service of the vehicle.

15. The method according to claim 12, wherein the assembly comprises an aircraft assembly.

16. The method according to claim 15, wherein the aircraft assembly comprises an aircraft landing gear assembly.

17. The method according to claim 12, wherein the operational part of the device comprises the first seal.

18. An assembly comprising:
a hydraulic device comprising an outer cylinder slidably coupled to a sliding piston so as to define an annulus between them where the outer cylinder and sliding piston overlap, the hydraulic device further comprising first and second seals provided within the annulus to define an intermediate portion between them, the second seal being arranged to seal the intermediate portion from the interior of the hydraulic device in a substantially fluid tight manner to confine the hydraulic fluid to the device, the first seal being arranged to seal the intermediate portion from an exterior of the device; and
a seal bridging tool comprising:
an insertion portion including one or more guide channels, the insertion portion being located within the annulus in parallel with the first seal to bridge the first seal so as to place the intermediate portion in fluid communication with the exterior of the hydraulic device via the one or more guide channels; and
a body portion having a thickness selected to inhibit the body portion from entirely entering the intermediate portion;
wherein the seal bridging tool is arranged to remain in position while the shock absorber extends.

* * * * *